J. K. STEWART.
MAGNETIC SPEEDOMETER.
APPLICATION FILED SEPT. 18, 1911.
1,057,682.
Patented Apr. 1, 1913.
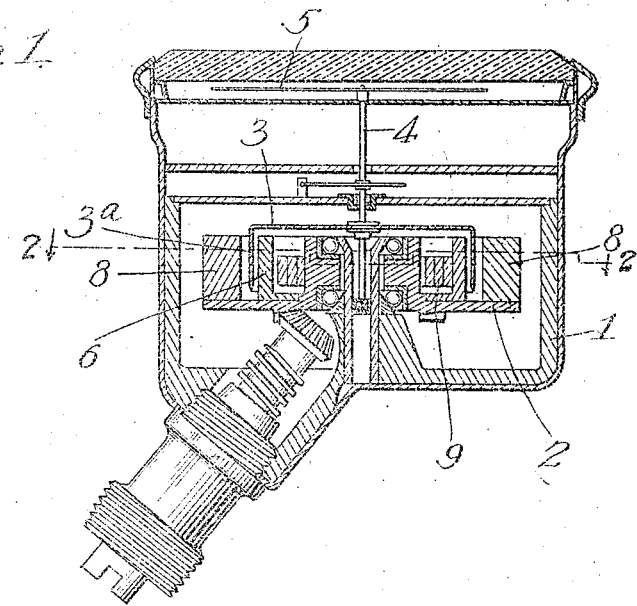
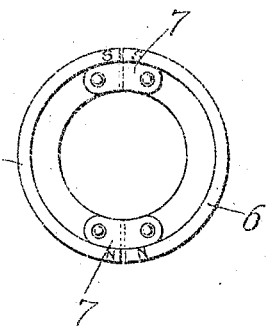
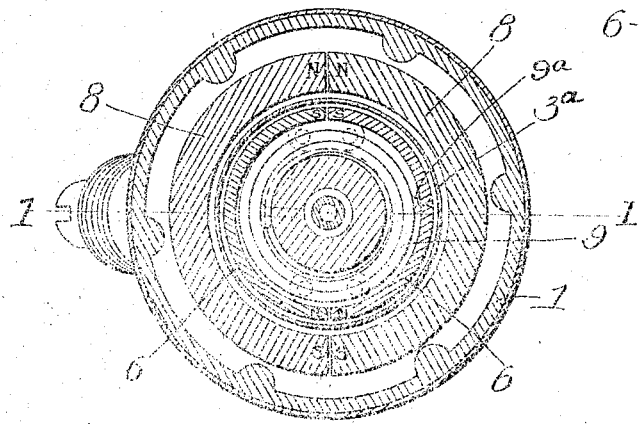
Witnesses:
Inventor,
John K. Stewart.
By Burton & Burton
Attorneys.

UNITED STATES PATENT OFFICE.

JOHN K. STEWART, OF CHICAGO, ILLINOIS, ASSIGNOR TO STEWART-WARNER SPEEDOMETER CORPORATION, OF THE STATE OF VIRGINIA.

MAGNETIC SPEEDOMETER.

1,057,682.   Specification of Letters Patent.   Patented Apr. 1, 1913.

Application filed September 18, 1911. Serial No. 649,816.

*To all whom it may concern:*

Be it known that I, JOHN K. STEWART, a citizen of the United States, residing at Chicago, in the county of Cook and State of Illinois, have invented new and useful Improvements in Magnetic Speedometers, of which the following is a specification, reference being had to the accompanying drawings, forming a part thereof.
The purpose of this invention is to provide an improved form of magnetic speedometer having means for automatically compensating for errors due to temperature changes.
It consists in the elements and features of construction shown and described as indicated in the claims.

In the drawings:—Figure 1 is an axial section, at the line 1—1 on Fig. 2, of an instrument embodying this invention. Fig. 2 is a section at the line 2—2 on Fig. 1. Fig. 3 is a detail plan view of the movable element and the means for moving it.

The instrument shown in the drawings is of familiar construction in the main features, comprising a case, 1, in which there is mounted for rotation a magnet carrier, 2, having magnets mounted upon it as hereinafter described, and, pivoted for oscillation about the axis of the rotating magnet, a biased non-magnetic element, commonly called the drag element, 3, to whose spindle, 4, the indicator hand, 5, is attached for indicating the speed of rotation. Upon the carrier, 2, there is mounted an outer pair of magnets, 8, 8, each semi-annular in form and positioned co-axially and supplementally on the carrier, 2. Within the outer magnets, 8, 8, there is a second pair of semi-annular magnets, 6, 6, mounted co-axially upon the carrier, their diameters being such that a narrow annular space is left between them and the outer magnets, 8, 8, into which the flange, $3^a$, of the biased element, 3, depends.
As shown, the poles of the two pairs of magnets are positioned opposite each other,— that is, the poles of the inner magnet are substantially or nearly radially inward from the poles of the outer magnets respectively. This position is not obligatory. The two inner magnets, 6, 6, are coupled together by non-magnetic couplings, 7, 7, and are mounted upon the carrier so that they have a limited range of movement together about the axis of the carrier; and to effect such movement for varying the magnetic drag to compensate for the effect of changes of temperature, there is connected to the hub of the carrier one end of a curved bar, 9, of metal, having a high coefficient of expansion, the other end being connected with the pair of inner magnets, 6, 6, in any convenient manner, as for example, by connection to one of said magnets as shown at $9^a$ in Fig. 2. The maximum efficiency, or efficacy of the magnets for producing eddy currents in the biased element is obtained when the poles of the inner magnet are at a certain position with respect to the poles of the outer magnets. This position of maximum efficiency may be ascertained with respect to any set of magnets by a little experiment, and the connection of the inner magnets to the carrier by means of the curved bar, 9, will be made so as to locate the poles at the point of maximum efficiency when the instrument is at the highest temperature at which it is designed to be operated, because at such highest temperature the resistance of the biased element is greatest, and the eddy currents produced therein by a given magnetic field rotating at a given speed are least. The proportions of the expanding and contracting bar, 9, will be made such as to vary the position of the inner pair of magnets with respect to the outer pair by the rotative adjustment described, the necessary amount to compensate for the change in electrical resistance of the biased element due to the change of temperature within any predetermined range for which the instrument is intended to be automatically compensated.

The two magnets of each pair are shown arranged with their poles of the same sign adjacent, the two pairs having their poles of opposite name opposed to each other with the biased drag element between them. When thus arranged, obviously the position of strongest drag action of the magnets upon the biased element is with the poles of the inner pair directly inward from the poles of opposite sign of the outer pair, and for certain situations and uses this arrangement of these several magnets is preferred.

It will be obvious that the number of magnets of each set hereinabove referred to as " pair " is not necessarily limited to two, but in order to have the magnets of each set relatively positioned with respect to their poles, as above described, that is, with adjacent poles in every instance of the same sign, the number of magnets in the set must be of an even number, and this is therefore the preferred construction for the special purposes for which the said arrangement of the poles is preferred.

I claim:—

1. In a magnetic speedometer, in combination with a rotatable magnet carrier, a biased drag element mounted for oscillation about the axis of rotation of the carrier; two magnets mounted on the carrier co-axially therewith with an annular interval between them, the drag element being positioned depending into the annular interval between the paths of rotation of said two magnets, said magnets being movable relatively to each other about the axis of the carrier to vary the relative positions of their respective poles, and a thermostatic device mounted on the carrier and operating upon one of the two magnets to rotatively move it relatively to the other by the expansion and contraction of said thermostatic element.

2. In a magnetic speedometer, in combination with a rotatable magnet carrier, a biased drag element mounted for oscillation about the axis of rotation of the carrier; two magnets mounted on the carrier, co-axially therewith, with an annular interval between their paths of rotation, the drag element being positioned intruding into said interval, one of said magnets being movable about the axis of the carrier for a limited distance relatively to the other, to vary the relative position of the poles of the respective magnets, and a thermostatic device having one end fixed with respect to the carrier and the other end connected with the movable magnet for so moving it.

3. In a magnetic speedometer, in combination with a rotatable magnet carrier; a biased drag element mounted for oscillation about the axis of rotation of the carrier; two magnets mounted on the carrier co-axially therewith, with an annular interval between them the drag element being positioned depending into the annular interval between the paths of rotation of said two magnets, one of said two magnets being movable relatively to the other for a limited distance about the axis of the carrier to vary the relative positions of the poles of the two magnets, and a thermostatic device attached at one end to the carrier and at the other end to the movable magnet for so moving it responsive to the changes of temperature.

4. In a magnetic speedometer, in combination with a rotatable magnet carrier and a biased drag element mounted for oscillation about the axis of rotation of the carrier; two sets of magnets, each set comprising an even number of magnets mounted following each other in circumferential order and occupying an annular space, said magnets being positioned in said annular space with their respective poles of the same sign adjacent, the two sets being relatively positioned on the carrier with the poles of one set opposite the poles of opposite sign of the other set, said two sets being co-axial and spaced apart from each other to leave an annular interval between them, the drag element being positioned depending into said annular interval.

5. In a magnetic speedometer, in combination with a rotatable magnet carrier and a biased drag element mounted for oscillation about the axis of rotation of the carrier; two sets of magnets, each set comprising an even number of magnets mounted following each other in circumferential order and occupying an annular space, said magnets being positioned in said annular space with their respective poles of the same sign adjacent, the two sets being relatively positioned on the carrier with the poles of one set opposite the poles of opposite sign of the other set, said two sets being co-axial and spaced apart from each other to leave an annular interval between them, the drag element being positioned depending into said annular interval; one of said sets being mounted on the carrier for a limited range of movement about the axis, and thermostatic means for so moving it with changes of temperature.

In testimony whereof, I have hereunto set my hand at Chicago, Illinois, this 12th day of September, 1911.

JOHN K. STEWART.

Witnesses:
Chas. S. Burton,
M. Gertrude Ady.